G. E. PRITCHARD.
PEA THRESHER AND HARVESTER.
APPLICATION FILED DEC. 7, 1915.
1,180,944.
Patented Apr. 25, 1916.
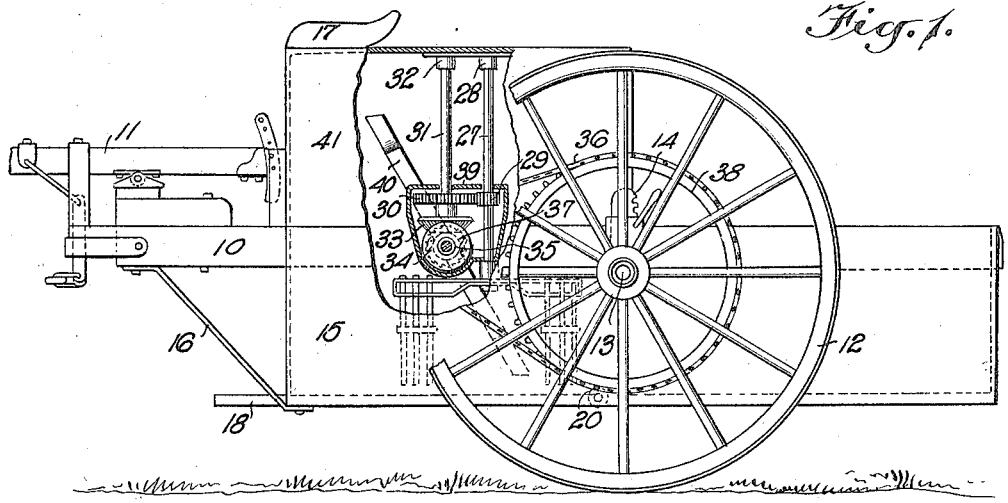
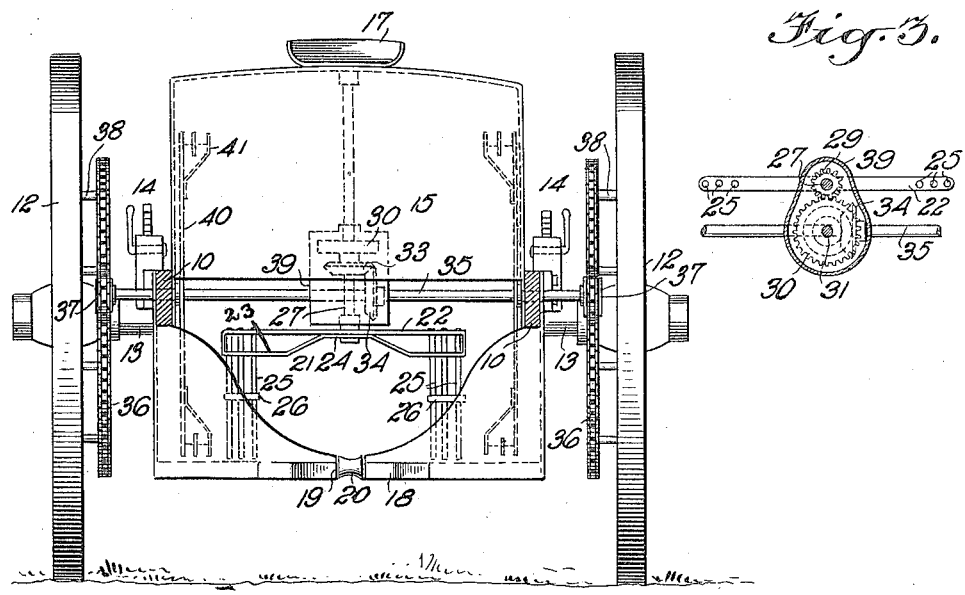
WITNESSES
INVENTOR
George E. Pritchard
BY
ATTORNEYS

UNITED STATES PATENT OFFICE.

GEORGE EDWARD PRITCHARD, OF ELIZABETH CITY, NORTH CAROLINA.

PEA THRESHER AND HARVESTER.

1,180,944. Specification of Letters Patent. Patented Apr. 25, 1916.

Application filed December 7, 1915. Serial No. 65,515.

*To all whom it may concern:*

Be it known that I, GEORGE E. PRITCHARD, a citizen of the United States, and a resident of Elizabeth City, in the county of Pasquotank and State of North Carolina, have invented a new and Improved Pea Thresher and Harvester, of which the following is a full, clear, and exact description.

My present invention relates to a thresher and harvester particularly adapted for harvesting peas and is of the type of machine, an example of which forms the subject of United States Letters Patent No. 1,117,904, granted to me November 17, 1914.

The prime object of the present invention is to improve threshers of the indicated character, particularly with reference to the simplicity and efficiency of the beating or threshing means and the actuating means therefor.

The invention will be particularly explained in the specific description following.

Reference is to be had to the accompanying drawings forming part of this specification in which similar reference characters indicate corresponding parts in all the views.

Figure 1 is a side elevation of a thresher and harvester embodying my invention; Fig. 2 is a transverse vertical section taken at the front of the machine; and Fig. 3 is a fragmentary sectional plan view showing the gearing for driving the thresher.

In carrying out my invention in practice in accordance with the illustrated example, a suitable vehicle frame is provided presenting side bars 10 having suitable draft devices including a tongue 11. The running wheels 12 turn on stub axles 13 on the side bars 10. The numeral 14 indicates means to adjust the height of the stub axles, said means forming no part of the present invention.

The vehicle includes a box 15 supported on the frame 10. The box may have braces 16 extending from the frame bars 10 at the front to the underside of the box. A seat 17 may be secured to the top of the box.

The forward end of the bottom of the box 15 has forwardly projecting members 18 at the center of the box, the same being beveled and leading to a longitudinal slot 19 in the bottom of the box for the passage of the vines, there being, preferably, at the rear end of the slot 19, a deflecting roller 20 to depress the vines. Thus, as the vehicle is drawn over the ground the vines will be guided to the longitudinal slot 19 by the members 18 and upon reaching the roller 20, will be deflected downwardly.

My improved means for beating and threshing the pea vines comprises a beater designated generally by the numeral 21 and includes a horizontal top bar 22, preferably formed of strap metal, said top bar including top and bottom members, the bottom member 23 being spaced from the top member at the ends and united to said top member at the center as at 24. A plurality of beating fingers 25 is secured to the cross bar 22 at the ends thereof and these are preferably braced by a connecting member 26 extending to each set of fingers.

The beater is mounted to turn on a vertical axis so that the beating fingers 25 will be given movement across the slot 19 thereby exerting a threshing action on the vines before the latter reaches the deflecting roller 20, and causing the peas to be threshed from the vines and thrown toward the sides of the box 15. To turn the beater, the same is mounted on the lower end of a vertical shaft 27, the upper end of which turns in a bearing 28 on the underside of the top of the box 15. To actuate the shaft 27, the same is provided with a pinion 29 which meshes with a gear wheel 30 on a vertical shaft 31 having a bearing 32 on the box 15 at the top, adjacent to the bearing 28. In order to drive the shaft 31 from the running wheels 12, said shaft 31 has keyed thereon a bevel pinion 33 which meshes with a bevel pinion 34 on a horizontal shaft 35 having bearings in the frame bars 10 of the vehicle and extending laterally outside of the said bars. Drive chains 36 extend about sprocket pinions 37 on the shaft 35 and about chain wheels 38 which are in fixed relation to the running wheels 12. The sprocket 37 is a ratchet sprocket as in similar gears, to permit turning of the vehicle.

By the described construction as the vehicle is driven over a field, it will be obvious that the described drive connection between the running wheels and the shaft 27 carrying the beater, will cause the said beater to turn rapidly about its vertical axis and effectively thresh the peas from the vines.

A suitable housing 39 is provided to inclose the several gear wheels, as best shown in Figs. 1 and 3.

Any suitable means may be provided for raking the peas rearwardly from the sides of the box 15 toward the rear end of the box, there being indicated for the purpose arms 40 having forked rake heads 41, said arms being mounted on the transverse driven shaft 35. The said rakes are fully described in my patent above referred to.

Having thus described my invention I claim as new and desire to secure by Letters Patent:

1. A thresher including a vehicle formed with a longitudinal vertical slot extending rearwardly therein from the front end thereof for accommodating vines to be threshed, and driven threshing means on said vehicle and mounted to revolve on a vertical axis above the slot and having a path of movement across the slot.

2. A thresher including a vehicle formed with a longitudinal vertical slot extending rearwardly therein from the front end thereof for accommodating vines to be threshed, a threshing means mounted to revolve on a vertical axis above the slot and having depending thresher elements movable in a circular path across the slot alternately in front of and in the rear of the vertical axis, and means to revolve the said threshing means.

3. A thresher including a vehicle having a longitudinal vertical slot extending rearwardly therein from the front end thereof for accommodating vines to be threshed, a beater mounted to revolve above the slot and in an approximately horizontal plane, said beater having sets of separated depending thresher fingers, and means to revolve said beater and cause the respective sets of fingers to cross said slot in rapid succession alternately in front of and in the rear of the axis of rotation of the beater.

4. A thresher including a vehicle having a longitudinal vertical slot extending rearwardly therein from the front end thereof for accommodating vines to be threshed, a beater directly above the slot, said beater having a cross bar and sets of thresher fingers depending therefrom near each end, a vertical shaft on which the said cross bar is suspended at about the center of the bar, and means to drive said shaft.

In testimony whereof I have signed my name to this specification in the presence of two subscribing witnesses.

GEORGE EDWARD PRITCHARD.

Witnesses:
MALICHI M. JONES,
CHARLIE W. WARD.

Copies of this patent may be obtained for five cents each, by addressing the "Commissioner of Patents. Washington, D. C."